United States Patent [19]
Gale et al.

[11] Patent Number: 5,550,604
[45] Date of Patent: Aug. 27, 1996

[54] COMPACT HIGH RESOLUTION LIGHT VALVE PROJECTOR

[75] Inventors: Ronald P. Gale, Sharon; Richard McClullough, Wrenthem; John C. C. Fan, Chestnut Hill, all of Mass.

[73] Assignee: Kopin Corporation, Taunton, Mass.

[21] Appl. No.: 254,276

[22] Filed: Jun. 3, 1994

[51] Int. Cl.⁶ .................................................. G03B 21/00
[52] U.S. Cl. .................................................. 353/31; 359/48
[58] Field of Search ............................. 353/119, 31, 34, 353/37, 99; 359/48, 49; 362/263

[56] References Cited

U.S. PATENT DOCUMENTS

| | | |
|---|---|---|
| 4,850,685 | 7/1989 | Kamakura et al. . |
| 4,864,390 | 9/1989 | McKechnie et al. . |
| 4,953,971 | 9/1990 | Highfill ............................ 353/122 |
| 4,963,001 | 10/1990 | Mayajima . |
| 4,976,536 | 12/1990 | Vogeley et al. ..................... 353/77 |
| 4,995,702 | 2/1991 | Aruga . |
| 5,037,196 | 8/1991 | Takafuji et al. ................... 353/122 |
| 5,054,910 | 10/1991 | Kazaki et al. ..................... 353/31 |
| 5,056,912 | 10/1991 | Hamada et al. .................... 353/38 |
| 5,073,013 | 12/1991 | Sonehara et al. ................... 359/63 |
| 5,075,798 | 12/1991 | Sonehara et al. ................... 359/490 |
| 5,098,183 | 3/1992 | Sonhara ............................ 353/31 |
| 5,102,217 | 4/1992 | Takafuji et al. ................... 353/84 |
| 5,135,300 | 8/1992 | Toide ............................... 353/33 |
| 5,278,595 | 1/1994 | Nishida ............................. 353/119 |
| 5,296,883 | 3/1994 | Park et al. ........................ 359/48 |
| 5,313,234 | 5/1994 | Edmonson et al. ................. 353/57 |
| 5,347,324 | 9/1994 | Sasaki et al. ..................... 348/789 |

FOREIGN PATENT DOCUMENTS

| | | |
|---|---|---|
| 352636 | 1/1990 | European Pat. Off. . |
| 362776 | 4/1990 | European Pat. Off. . |
| 3142664A1 | 5/1983 | Germany . |
| 3933862A1 | 4/1991 | Germany . |
| 62-293221 | 12/1987 | Japan . |
| 63-102572 | 5/1988 | Japan . |
| 63-147151 | 6/1988 | Japan . |
| 1237592 | 9/1989 | Japan . |
| 2191057 | 12/1987 | United Kingdom . |
| 94/07177 | 3/1994 | WIPO . |
| 94/10600 | 5/1994 | WIPO . |
| 94/10794 | 5/1994 | WIPO . |

OTHER PUBLICATIONS

Sumiyoshi et al., "Devise Layer Transferred Poly-si TFT Array For High Resolution Liquid Crystal Projector" *IEDM* (1989) pp. 165–168.

Stupp E., "High Definition Projection Displays Using LCD Light Valves" Flat Information Displays—1990, Conference Dec. 11 & 12, 1990.

*Primary Examiner*—William C. Dowling
*Attorney, Agent, or Firm*—Hamilton, Brook, Smith & Reynolds, P.C.

[57] ABSTRACT

The present invention relates to a light valve projector in which a small high resolution active matrix transmission display is used with a light source, coupling optics and a projection lens to provide a compact presentation system. A preferred embodiment of the system comprises a three light valve system with an arc lamp within a compact housing in which dichroic mirrors separate light from the source into three primary colors and directs the separated light through three active matrix displays manufactured by a thin film transfer process and having a small active area.

20 Claims, 13 Drawing Sheets

·········· = Blue
∘∘∘∘∘∘∘∘∘∘ = Green
− − − − − − = Red

COMPACT HIGH RESOLUTION LIGHT VALVE PROJECTOR

BACKGROUND OF THE INVENTION

Light valve liquid crystal display systems have been developed to provide for projection of video and data images. For the projection of color images these display systems have utilized three active matrix liquid crystal displays which are typically aligned relative to a dichroic prism which combines the three images, each having a distinct primary color, into a single colored image that is projected with a lens onto a viewing screen.

Existing light valve projection systems use several dichroic mirrors to separate light from a light source into three primary colors and to direct each of these primary colors through a separate light valve. These light valve systems use active matrix liquid crystal displays in which switching transistors are fabricated in polycrystalline silicon that has been deposited on glass. Attempts to fabricate small area high resolution displays using circuits fabricated on glass has met with limited success. Existing displays with a 640×480 pixel geometry, for example, have required displays with active areas in excess of 500 mm². The optics and alignment mechanism necessary to separate the colors and combine the generated images where all three light valves are of this size has necessitated system volumes, including the light source and projection lens, in excess of 1000 cubic inches and typically weigh more than 18 pounds.

A continuing need exists, however, for smaller more portable projection display systems which have high resolution and full color capabilities, and at the same time are readily and inexpensively manufactured.

SUMMARY OF THE INVENTION

The present invention relates to a compact projector utilizing a light valve system to form and project high resolution images on a viewing surface. A preferred embodiment of the projector employs a plurality of light valves in an optical system to separate light from a light source into a plurality of colors, direct light of each separate color through one of the light valves and then combines the images formed by each light valve into a color image that is directed through a projection lens onto a viewing surface.

Unlike existing projectors which are limited by their size, weight, and resolution, the present invention employs a high resolution active matrix light valve where each light valve in the color projector system, for example, has a much smaller active area with a diagonal dimension of less than 26 mm and a pixel resolution of at least 300,000 within the active area. By reducing the size of the light valve active area while maintaining a high resolution, the overall size and weight of the system can be substantially reduced. The term pixel resolution, for the purposes of this application, refers to the number of pixel electrodes in the light valve that provide separate points or "dots" within the image that is generated. Thus, for example, a monochrome 640×480 light valve has a pixel resolution of over 300,000, as each of the 307,200 pixel electrodes corresponds to a point within the generated image. For a single color light valve using triads of three pixel electrodes, each corresponding to a primary color, a pixel resolution of 300,000 requires at least 900,000 pixel electrodes to be fabricated within the active area.

To maintain the brightness of the projector, a small high intensity lamp is needed to deliver sufficient light along the optical path between the source and the projection lens without the use of large condenser or focussing optics. Xenon or metal halide arc lamps are used in preferred embodiments having 15–45 Watts of output power in the visible spectrum. A preferred embodiment of the arc lamp uses an arc gap equal to or less than 2 mm, and preferably in the range of 1.0–1.6 mm, and uses an elliptical or parabolic reflector to provide a beam shape and intensity highly suitable for the smaller active area of the light valves being used. When the arc gap of the lamp is less than 2 mm putting more light, the beam divergence of the lamp is reduced. A small reflector with a diameter of about 75 mm or less is used with the lamp and fits within a compact housing. The smaller and brighter beams reduces the size of the coupling optics necessary to direct light efficiently through the light valve system.

To produce a light valve having more than 300,000 pixels and an active area having a diameter of less than 26 mm, or a total area of less than about 320 mm², requires a smaller pixel area. A further preferred embodiment provides a pixel resolution of at least 1,300,000. A valve having 1280×1024 array within an active area of less than 320 mm² provides this resolution. This can be achieved using the transferred thin film circuit processes described in U.S. Pat. Nos. 5,206,749, 5,256,562 and 5,317,436, the entire contents of which are all incorporated herein by reference. Circuits having pixel areas between 100 um² and 1000 um² can be fabricated using the processes described in the above referenced patents. These circuits have been used to fabricate liquid crystal displays in which the optical aperture of each pixel is approximately 40% geometrical transmission.

The light source and associated power supply, the light valve system, coupling optics, projection lens and light valve driving circuits can be configured within a projector housing having several preferred embodiments. Preferred embodiments include a horizontal configuration and a vertical configuration. The lamp and beam shaping optics in both configurations can be can be aligned in one direction within the optical path of the projector, and the light valve system and projection lens are aligned in a second direction with one or more mirrors used to fold the optical path.

The projection lens is preferably a zoom lens that produces projected images at distances from 1 meter to 6 meters from the projector. The zoom range is about 1.6–1.7. The focal length is between 35–55 mm.

A preferred embodiment of the three light valve color system has a weight under 12 lbs. and preferably under 10 lbs. and a volume under 400 cubic inches. A single light valve color projector system is smaller and lighter than the three valve system. The single light valve color projector system can be made using the methods described in U.S. Ser. No. 08/215,555 filed on Mar. 21, 1994, and entitled "Method of Fabricating Active Matrix Pixel Electrodes", the entire contents of which is incorporated herein by reference.

A preferred embodiment of the invention utilizes glass elements bonded together to provide dichroic prisms that combine the separated light in a three valve system. The light valves are mounted to this optical combiner to provide rigid alignment of the light valves.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
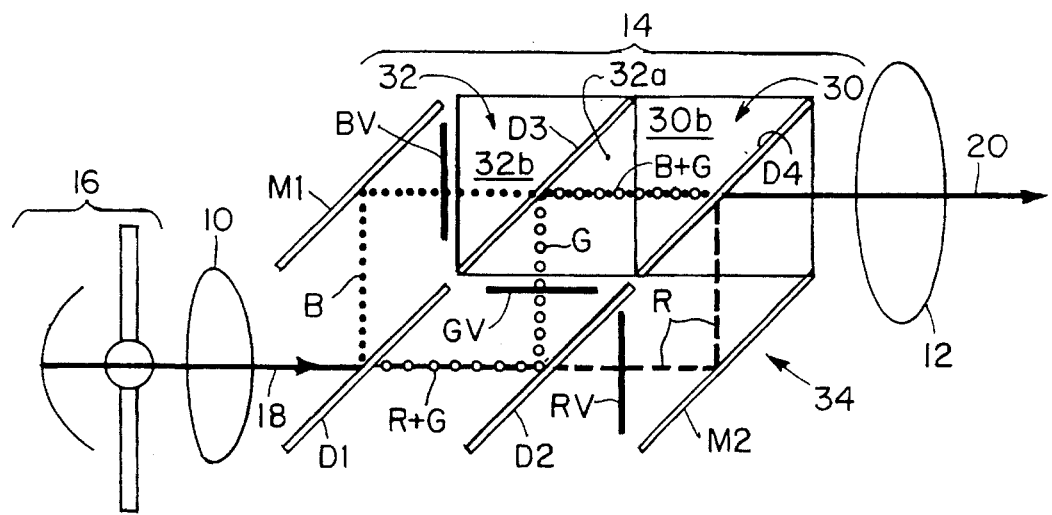
FIG. 1 is a schematic diagram of a light valve projector system in accordance with the present invention.

FIG. 1 is a schematic diagram of a light valve system in accordance with a preferred embodiment of the present invention. The output of a light source 16 is focused by a lens 10, resulting in a beam of white light 18. The beam 18 enters the light valve system 14 where it comes in contact with dichroic mirror D1 which reflects blue light B and allows red and green light R+G to pass through. The blue light beam B reflects off mirror M1 and passes through a blue light valve BV. The output of the blue light valve BV is directed through dichroic prism D3. The red and green light R+G passing through dichroic prism D1 comes in contact with dichroic prism D2 where the green light G is reflected and the remaining red light R passes through. The green light beam G passes through a green light valve GV and enters dichroic prism D3 where it is reflected and joins with the output of the blue light valve BV, the combination of blue and green modulated light B+G is directed through dichroic prism D4. The red light R passing through dichroic prism D2 thereafter passes through a red light valve RV, reflects off mirror M2 and enters dichroic mirror D4 where the red light R joins with the blue and green light output B+G of dichroic mirror D3, resulting in a color output image 20 which is focused by projection lens 12.

Source 16 is preferably a xenon or metal halide arc lamp having a color temperature in the range between 4000 and 9000 degrees and having an arc gap of less than 2 mm, and preferably in the range of 1.0–1.6 mm. The smaller arc lamp provides for the capture of a higher percentage of the output light. The use of a small diameter reflector that is about 75 mm in outer diameter or less in a preferred embodiment fits within a compact housing as described below.

Dichroic mirrors D3 and D4 can be made as shown in FIG. 1 using cubes 30, 32 on which light valves GV and BV are mounted. Cube 32 has two prism elements 32a, 32b that are cemented together using optically transparent cement and a thin film dichroic coating that combines the blue and green components of the generated image. Similarly cube 30 has components 30a and 30b that form a dichroic prism which combines the blue and green component with the red component. Mirror M2 is formed on on side of glass element 34. The adjacent faces of glass elements 30,32 and 34 are bonded together as shown and provide a rigid structure on which the light valves BV, GV and RV are mounted to provide an efficient mechanism for aligning the three valves.

Figure 2:
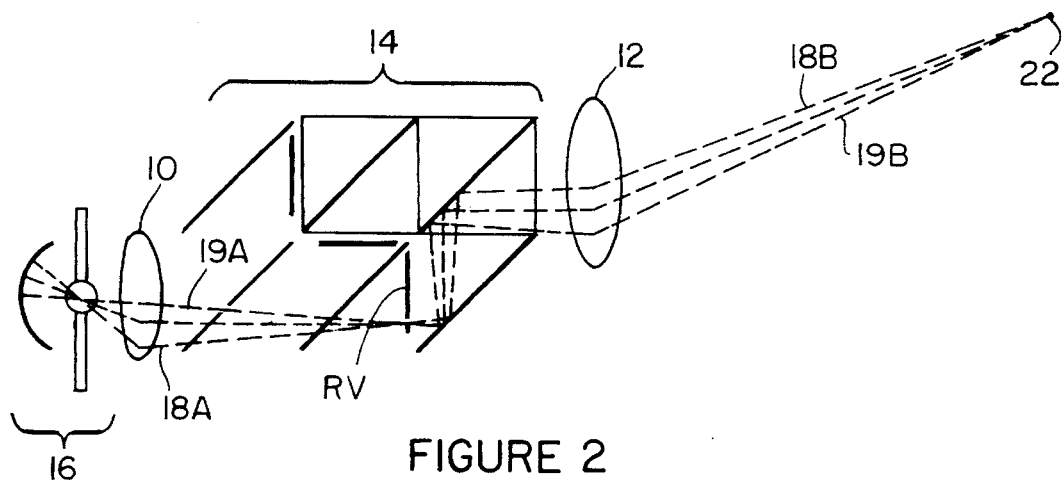
FIG. 2 is a schematic diagram showing the relative spread of a beam from a light source to a screen for a light valve system in accordance with the present invention.

FIG. 2 is a schematic diagram showing the relative spread of a beam exiting the light source 16 passing through the light valve system 14 and being focused on a screen 22. Light emitted from the light source 16 is focused by the lens 10 onto the red light valve RV. The light passes through the red light valve RV, exits the light valve system 14 and is focused by the projection lens 12 onto the screen 22.

Figure 3:
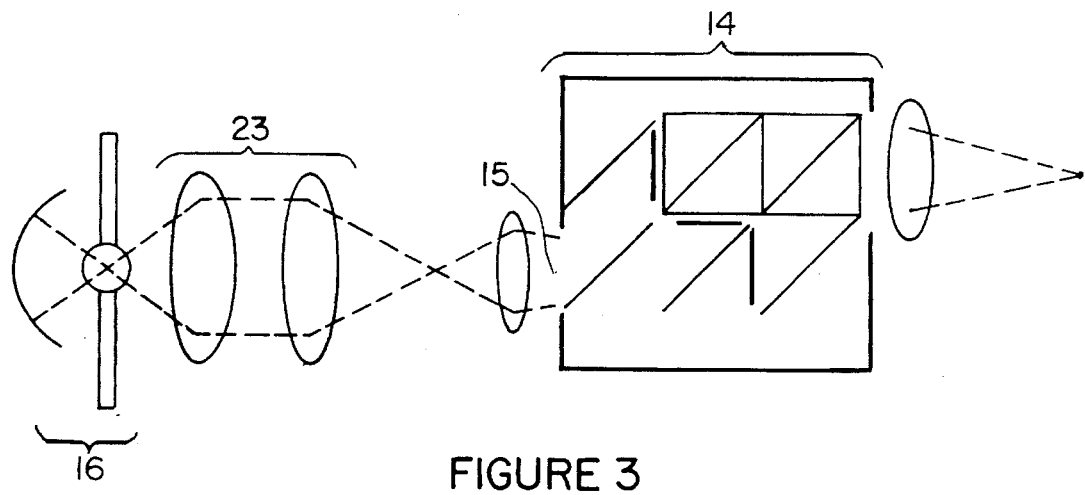
FIG. 3 is a schematic diagram of a light valve projector system wherein an optical coupler is used to modify the width of the source beam.

In FIG. 3 a larger light source 16 is used. An optical coupler 23 modifies the beam so that its width at the aperture of the light valve system 14 is appropriate for the size of the light valve. In the present invention, each light valve has at least 300,000 pixel electrodes and can have as many as 2,000,000 or more pixel electrodes. The pixel electrodes transmitting light through each valve define an active area which is preferably less than 320 mm², or have a diagonal dimension of less than 26 mm in a rectangular geometry. The displays are made using processes described in greater detail below and in the U.S. Patents and applications referenced herein.

A preferred embodiment uses three light valves having 640×480 arrays. A higher resolution embodiment uses a 1280×1024 array to provide a pixel resolution of over 1,300,000.

Figure 4:
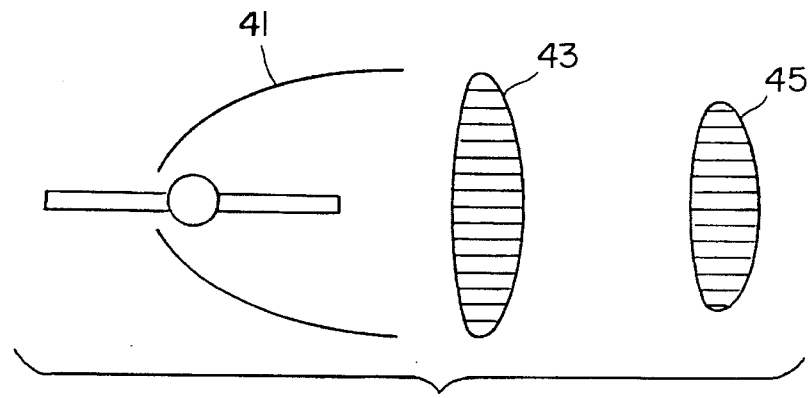
FIG. 4 is a schematic diagram of a parabolic reflector light source having lens arrays.

FIG. 4 is a schematic diagram of a parabolic reflector light source 41 having a pair of lens arrays 43,45 or optical integrators providing for uniformity and shaping of the light source beam for input into the aperture of the light valve system.

Figure 5A:
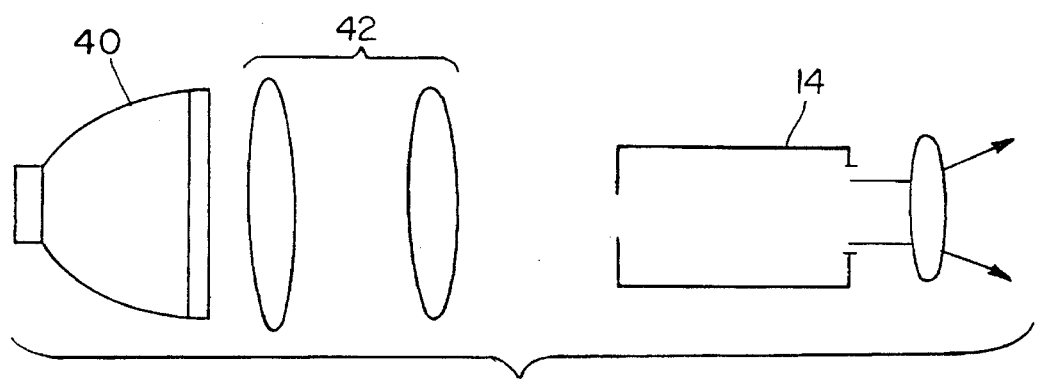
FIG. 5A is a schematic diagram of a projector system wherein a pair of focusing lenses are used for focusing a source beam into the aperture of a light valve system.
Figure 5B:
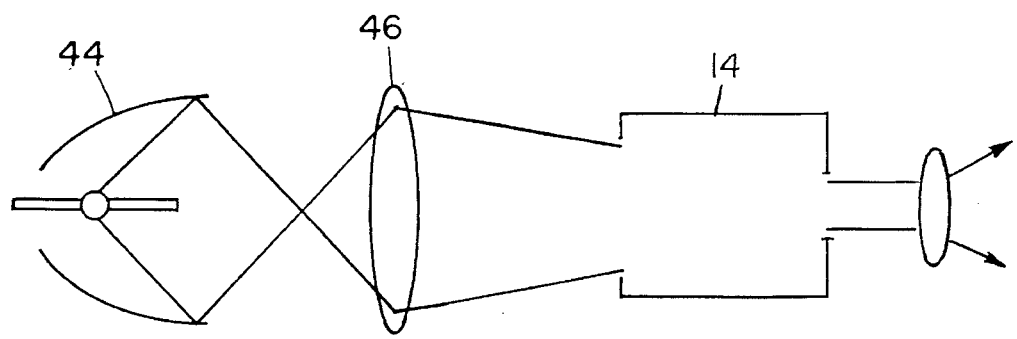
FIG. 5B is a schematic diagram of a projector system having an elliptical reflector which provides a light beam which is focused by a single lens into the aperture of a light valve system.

FIGS. 5A and 5B show alternate methods of sourcing light into the light valve system. FIG. 5A uses a light source 40 and a pair of focusing lenses 42 for modifying the width of the beam for entrance into the light valve system 14. In FIG. 5B, an elliptical reflector 44 provides light which is focused by lens 46 into the aperture of the light valve system 14.

Figure 6:
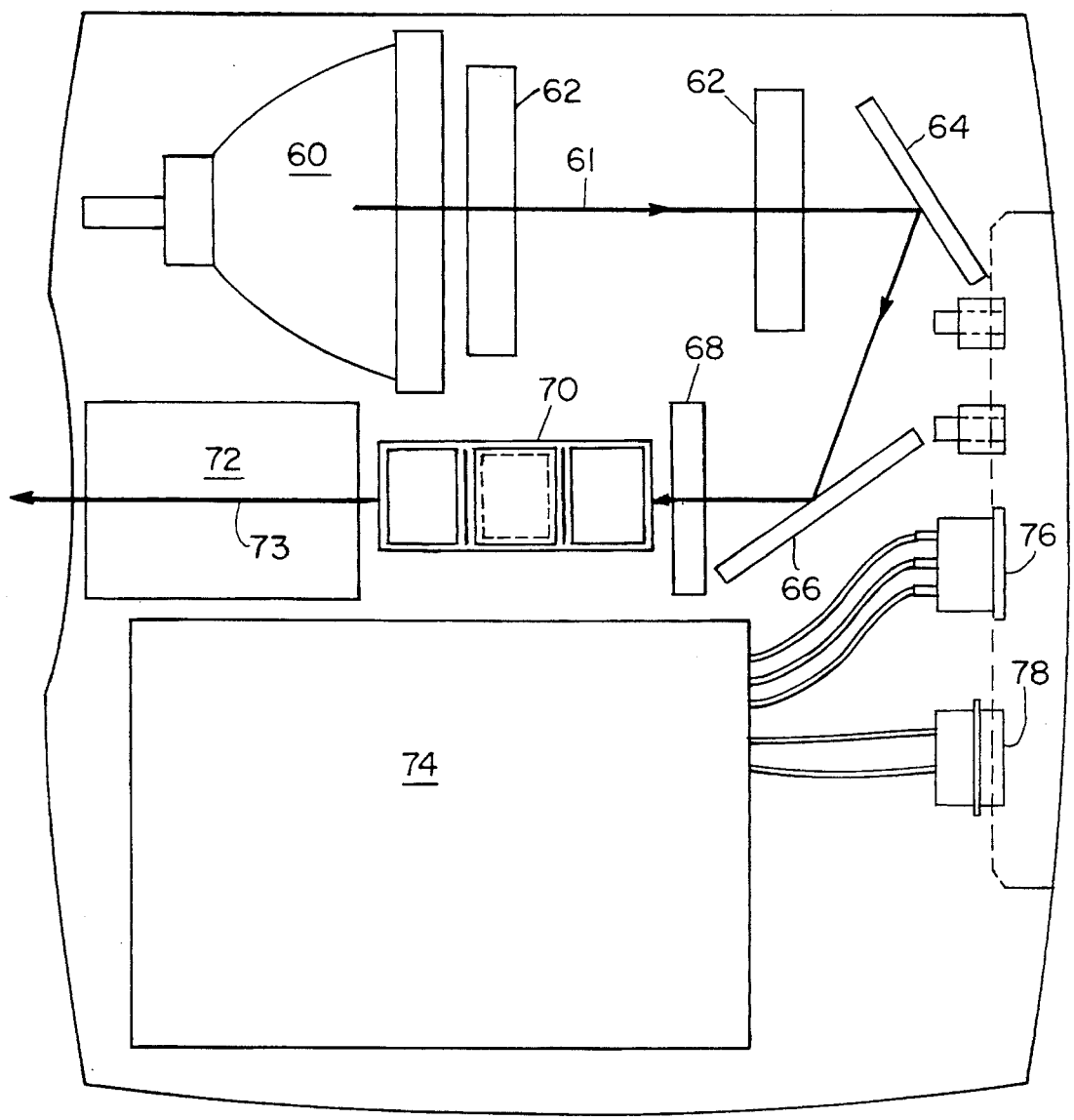
FIG. 6 is a top view of the internal components of a flat version of a projector in accordance with the present invention.

FIG. 6 is a top view of the internal components of a light valve projector in accordance with the present invention. A light source 60 provides a light beam for the system. Optical integrator 62 of the type available from Phillips Consumer Electronics, Inc. modify the width of the light beam so that it will efficiently couple to the entrance aperture of the light valve system 70. Mirrors 64 and 66 fold the optical path of the beam 61 emitted from the light source 60 to the mirror 64 causing it to pass in an opposite direction from mirror 66 towards the projection lens 72. The beam is directed into the entrance aperture of the light valve system 70 by a field lens 68. The light valve system 70 modulates the beam as discussed in FIG. 1. The resulting output beam 73 is focused by the projection lens 72 onto a screen. Power is provided at jack 76, controlled by switch 78, and distributed by power supply 74.

Figure 7:
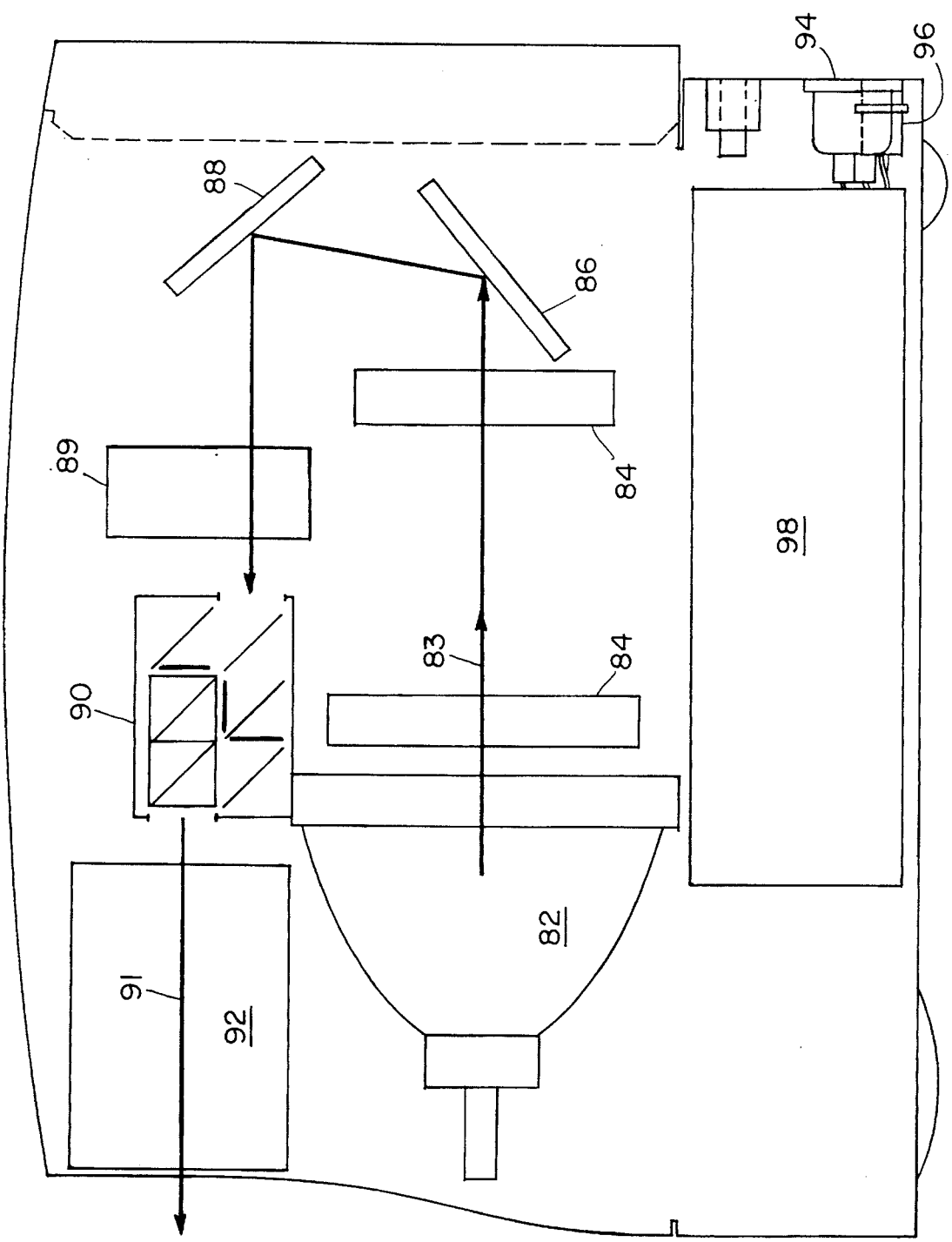
FIG. 7 is a side view of the internal components of an upright version of a light valve projector in accordance with the present invention.

FIG. 7 is a side view of the upright version of a light valve projector in accordance with the present invention. Light is produced at a light source 82. The width of the light beam 83 is controlled by optical integrator 84 and the direction of the beam is reversed by mirrors 86 and 88 as in the flat or horizontal version described above in conjunction with FIG. 6. The light is focused into the aperture of the light valve system 90 by a field lens 89, modulated by the light valve system 90 and the output beam 91 is enlarged by a projection lens 92 onto a screen. Power is provided at a power jack 94, controlled by a power switch 96 and distributed by a power supply 98.

Figure 8:
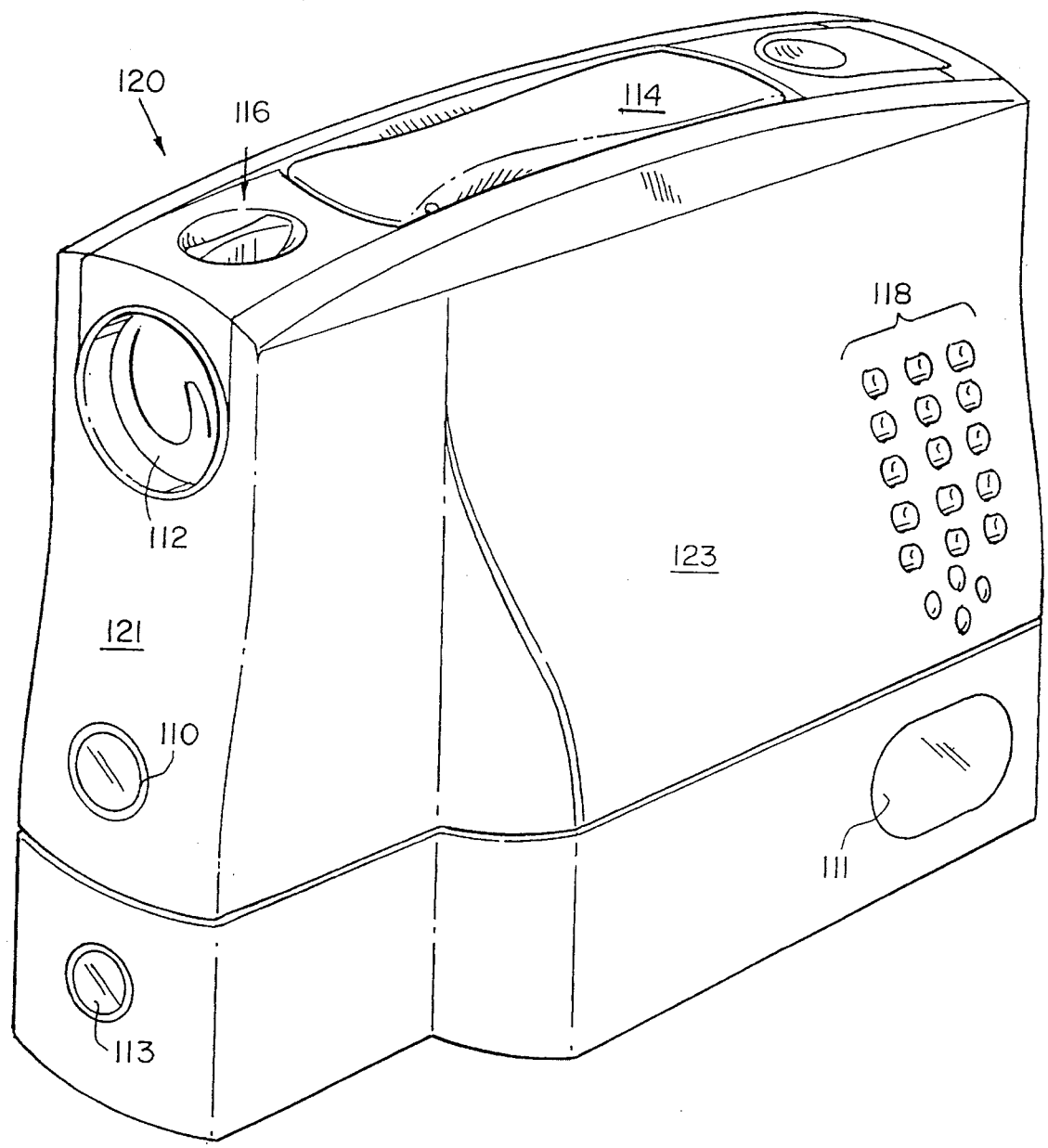
FIG. 8 is a perspective view of the front side of an upright version of a light valve projector in accordance with the present invention.

FIG. 8 is a perspective view of the front side of upright version of a light valve projector. The chassis 120 is substantially sinuous in shape. Control buttons 118 are seated on a side 123 of the chassis 120 and provide a means for adjusting the projector output, for example: brightness, contrast, tuning, color, balance, focus, and volume. They also permit a user to add graphs or text to the output, save an output, reset an output and control output positioning. Signals are received from a remote control at remote control sensor window 110. A handle 114 is provided on the top of the chassis 120 for transporting the unit. Projector output is provided at output lens 112 positioned on the front face 121 of chassis. The focus knob 116 controls the magnification of the output lens 112. Both zoom and focus controls can be manual or motorized. Audio speaker 11 of a pair of speakers can be provided in the projector housing.

Figure 9:
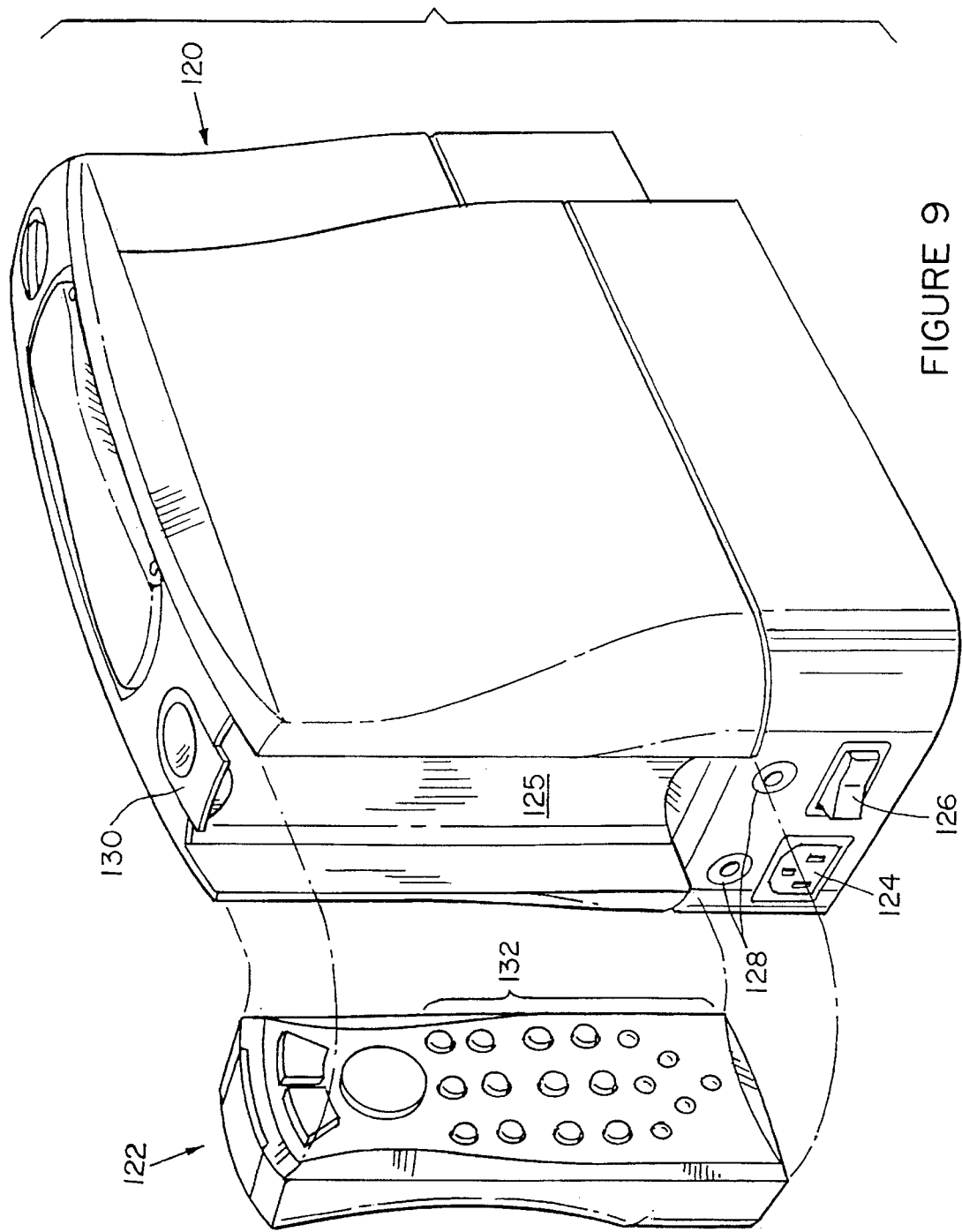
FIG. 9 is a perspective view of the rear side of an upright version of a light valve projector in accordance with the present invention.

FIG. 9 is a perspective view of the rear side of an upright version of a light valve projector. A remote control 122 attaches to the rear face 125 of the chassis 120. The remote control 122 is secured by seating member 130. The remote control 122 includes a set of control buttons 132 for controlling the projector which are similar to the control buttons 118 on the front face 123 of the chassis 120 shown in FIG. 8. The remote control 122 communicates with the projector chassis 120 by transmitting an infrared signal to the remote control receiver window 110 on the front face 121 of the chassis 120 shown in FIG. 8. Power is transferred to the unit at power jack 124 and controlled by power switch 126. Video input is provided at video jacks 128.

Figure 10:
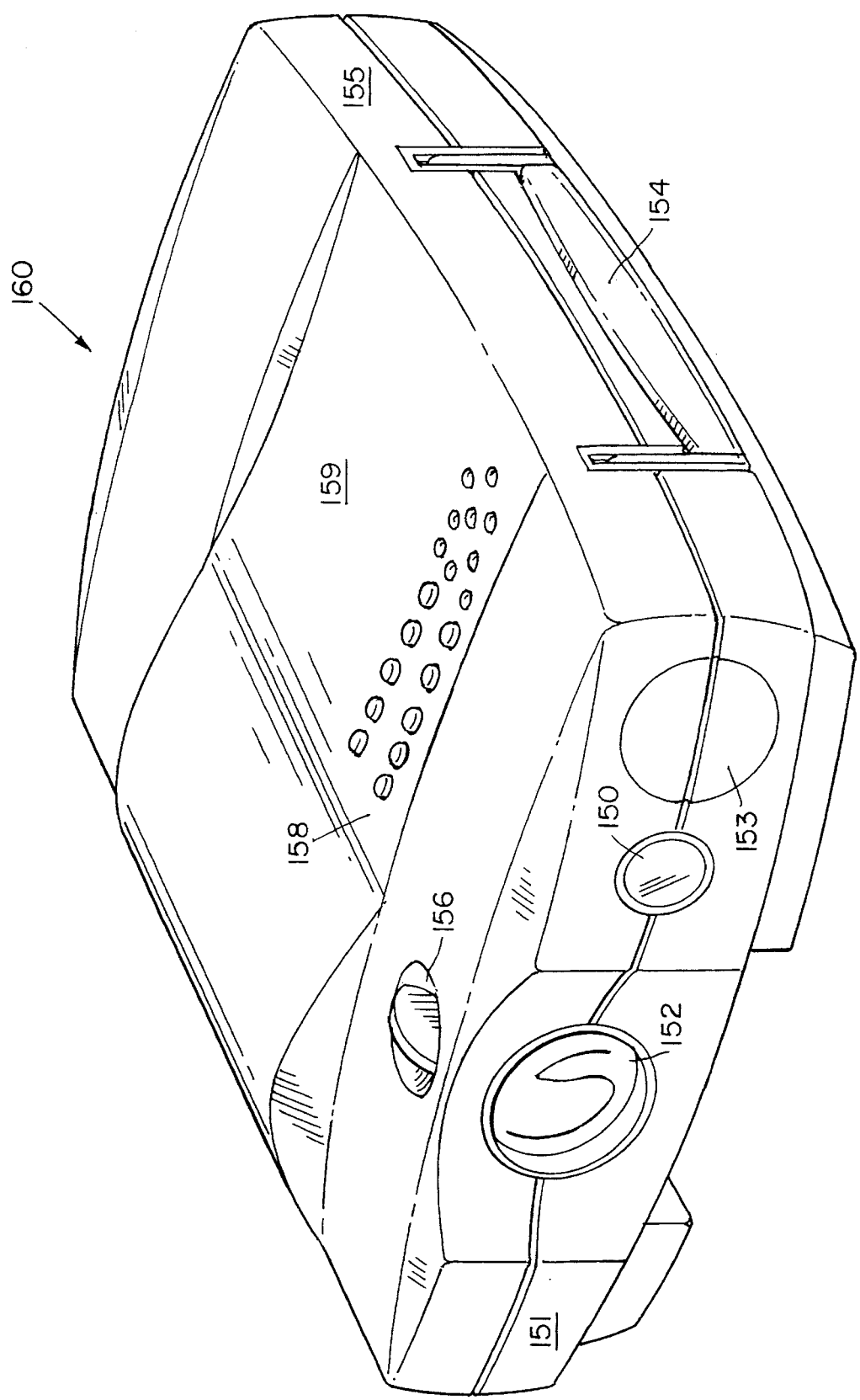
FIG. 10 is a perspective view of the front side of a flat version of a light valve projector in accordance with the present invention.

FIG. 10 is a perspective view of the front side of a flat version of a light valve projector. The chassis 160 is again substantially sinuous in shape and sits flat rather than upright as in FIGS. 8 and 9. A handle 154 is provided on a side 155 of the chassis 160 for transporting the unit. Control buttons 158 are positioned on the top 159 of the chassis 160 for controlling the functionality of the unit as described above. A remote control sensor window 150 and output lens 152 are provided on the front face 151 of the unit. An optional audio speaker 153 can be provided on face 151. An output lens focus knob 156 is provided on the top 159 of the chassis 160. This and the other embodiments described herein can be provided with an electrically actuated motor to provide remote zoom lens control.

Figure 11:
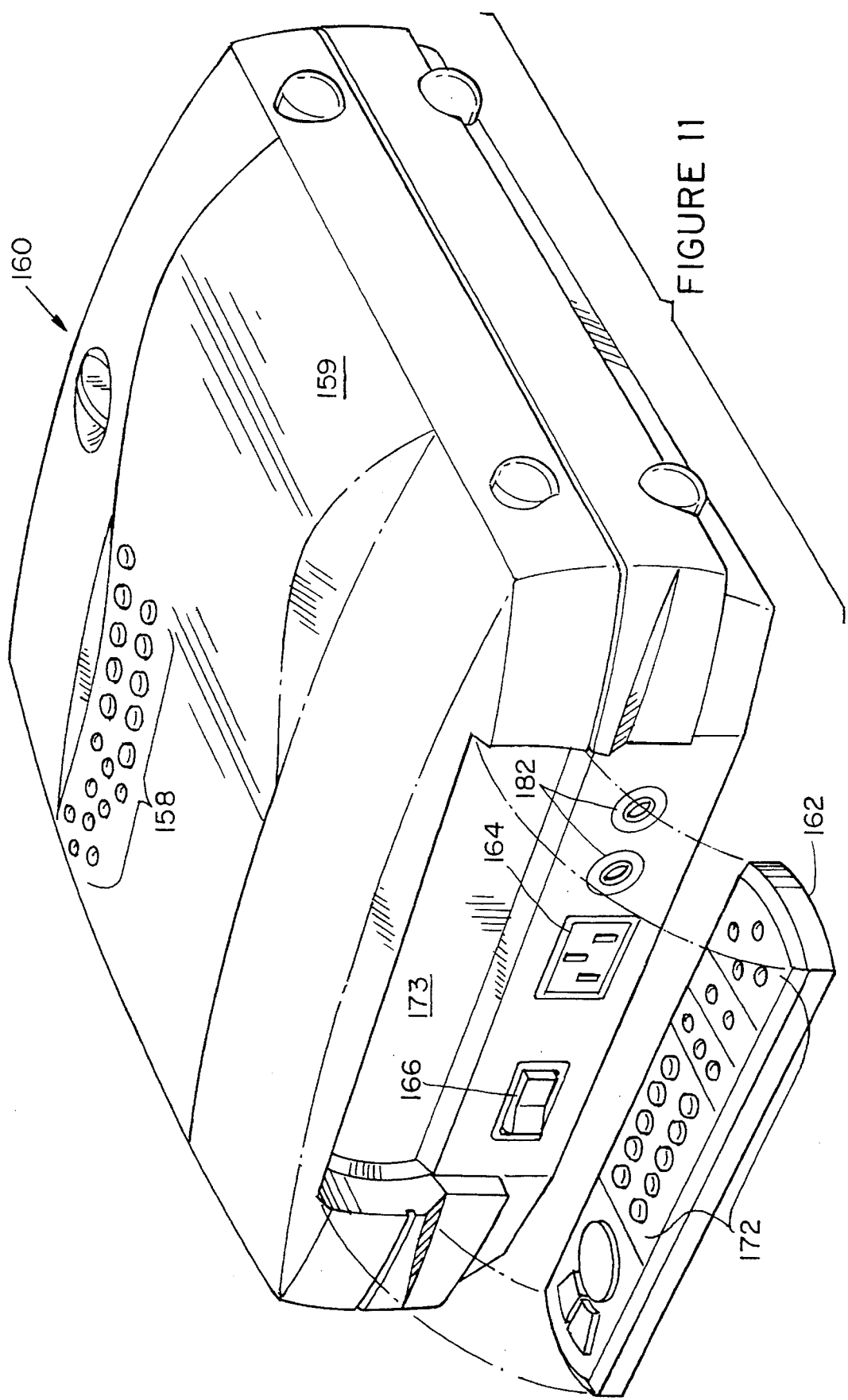
FIG. 11 is a perspective view of the rear side of the flat version of a light valve projector in accordance with the present invention.

FIG. 11 is a perspective view of the rear side of a flat version of a light valve projector. A remote control 162 includes buttons 172 which are similar to the control buttons 158 positioned on the top 159 of the chassis 160. The remote control 162 attaches to a port on the side 173 of the chassis. Power is provided at power jack 164 and controlled by power switch 166. Video input is provided at video jacks 182 to accept different electronic formats such as NTSC, PAL, SVHS.

Figure 12:
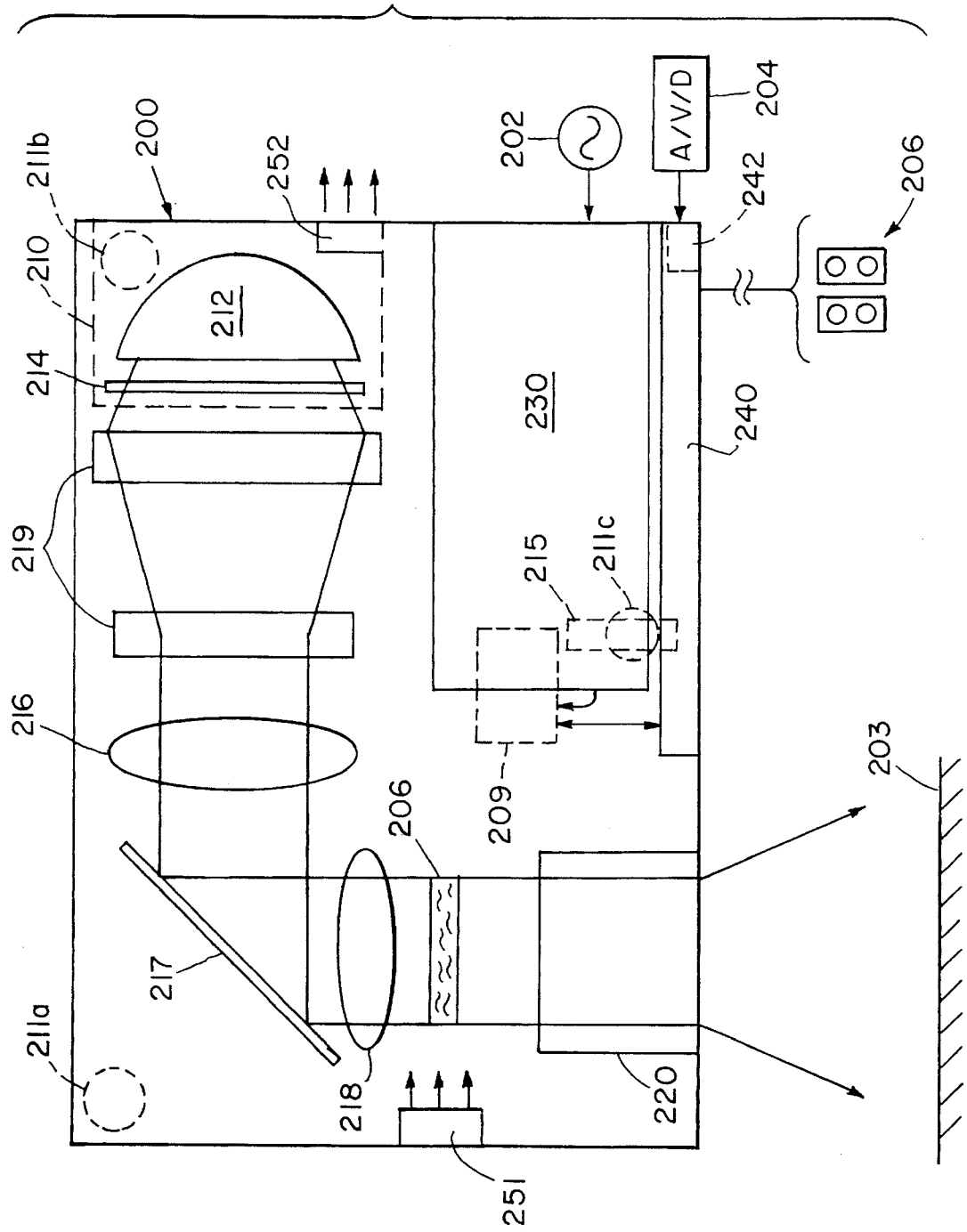
FIG. 12 is a schematic diagram of a single light valve projector in accordance with the invention.

The projector 200 illustrated in FIG. 12 includes the optical components required to project the image formed on a single monochrome or color light valve display panel onto a viewing surface 203. The projector 200 is coupled to an external power supply 202, and is also coupled to a remote video source 204 which provides video signals and can also provide audio and data signals to the display system. In addition, the video source 204 can receive control signals (e.g. mouse signals). The video source can be a computer, a video player, a television station, or any other video source coupled to the projector 200 by a direct wire, an antenna or both. Circuitry in the projector 200 separates the audio signals from the input stream and generates analog signals to drive internal or remote speakers 200. Circuitry within the projector 200 also separates video signals from the input stream, possibly manipulating the video data stream, and provides the video information to the light valve display panel 206. Electrical power required by the light valve display panel and associated circuitry is provided to projector 200 from power supply 202.

The single light valve embodiment can utilize a stripe electrode configuration. For example, a color filter system employing 3 primary colors includes a 1920×480 pixel electrode configuration. This results in 921,600 pixel electrodes providing a pixel resolution of 307,200.

The projector 200 is supported by three foot pads 211. In a particular preferred embodiment, two pads 211a, 211b are positioned at the rear corners of the projector 200. The third pad 211c is mounted on an extendable bracket 215. The third pad 211c can be extended from the front of the projector 200 using the bracket 215. Once positioned, a thumb screw can be used to adjust the projection angle of the projection system.

The optical elements inside the projector 200 include a light source, an optical integrator described previously a mirror and projection lens. Various arrangements of optical elements can be used to practice the invention.

As illustrated, there is a white light source 212, an infrared filter 214, integrator elements 219, a collecting lens 216, a mirror 217, and a field lens 218. The infrared filter 214 absorbs substantially all infrared radiation emitted by the light source 212, while passing the visible light. The collecting lens 216 focuses the cool light emitted by the infrared filter 214 into a collimated beam of light. The mirror 215 reflects the collimated beam of light toward the liquid crystal display panel. The image formed on the display panel is projected by projection optics 220 onto a viewing surface.

A power supply 230 drives the light source 212. The circuitry 240 includes an optional receiver 242 for receiving wireless video transmissions. Circuitry 240 separates the audio signals from the input stream and outputs the audio signals to a speaker subsystem. The circuitry 240 also provides video signals to the light valve driver circuitry within the projector.

In the various embodiments depending upon the lamp and power requirements of the system a number of heat dissipating components can be used within confined area of the projector housing. Furthermore, the display panel can be adversely affected by heat buildup. Accordingly, the projector 200 can be provided with a ventilation system. As illustrated, one fan 251 creates an air flow across the display panel and a second fan 252 draws air from the interior of the projector 200. In particular, the second fan 252 is positioned near the light source 212 and the power supply 230, which can be the primary heat generators within the projector. Other appropriate thermal management techniques are considered to be within the scope of this invention.

Figure 13:
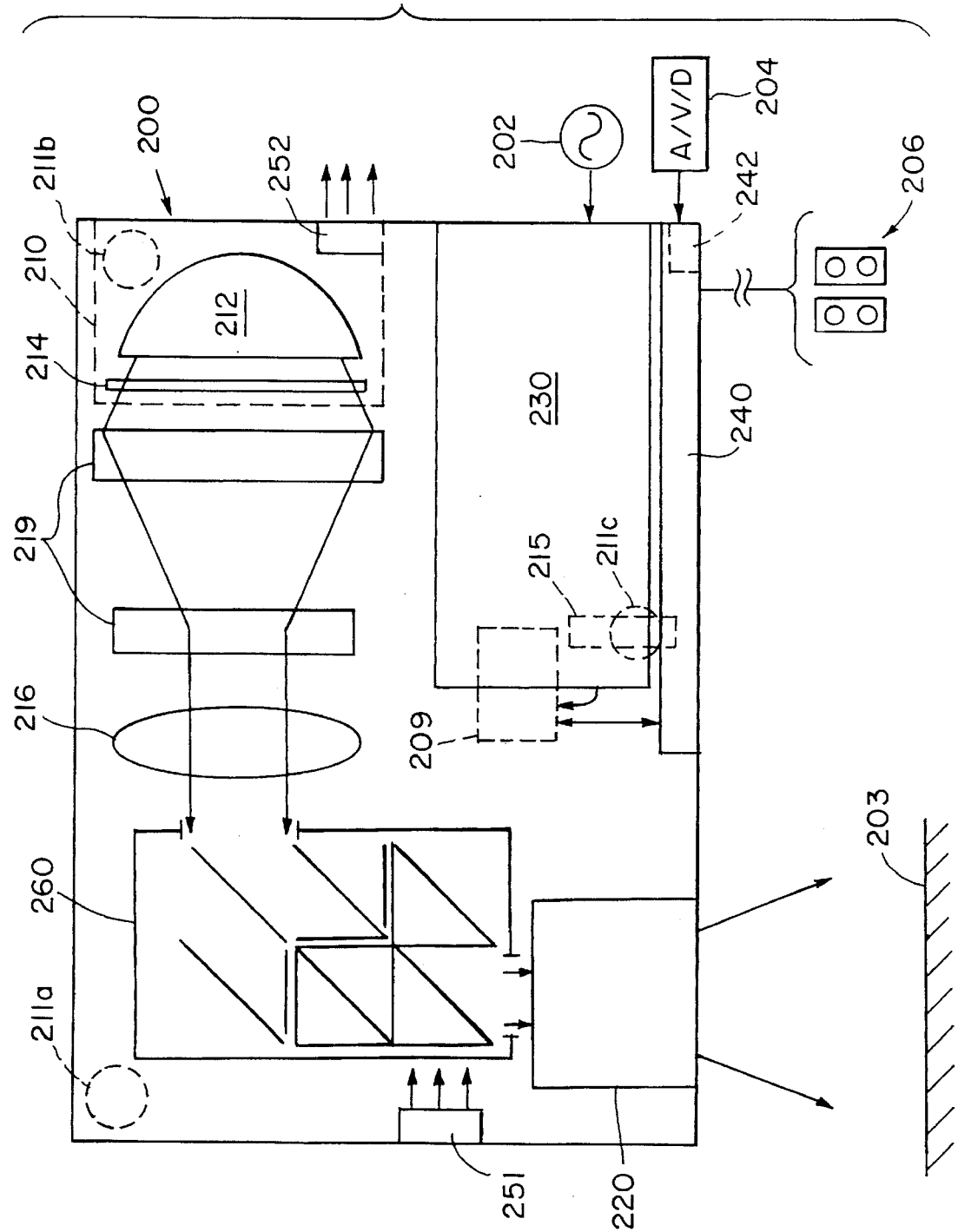
FIG. 13 is a schematic diagram of a three light valve color projector in accordance with the invention.

FIG. 13 illustrates a preferred embodiment in which the optical path between the light source and the projection lens is reflected by mirrors positioned in the light valve system at a corner of the housing, at an angle of about 90°. An integrator 219 is used to shape the light from the lamp as previously described for coupling to a three light valve system 260.

Figure 14A:
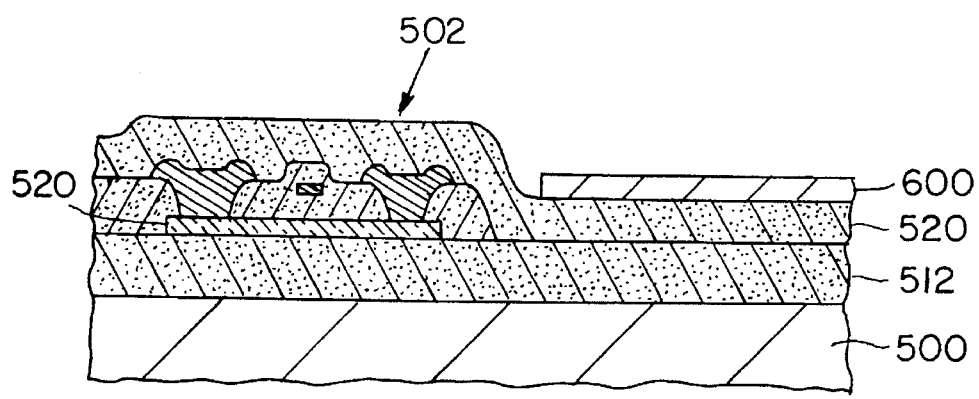
FIGS. 14A–14C show a thin film transfer and liquid crystal display fabrication process sequence in accordance with the invention.
Figure 14B:
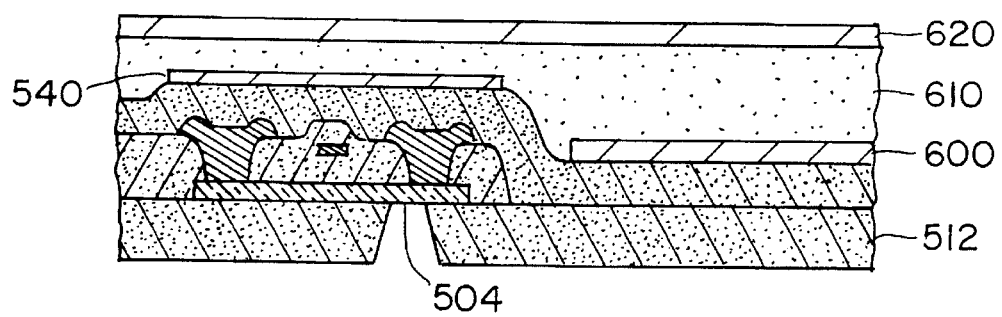
Figure 14C:
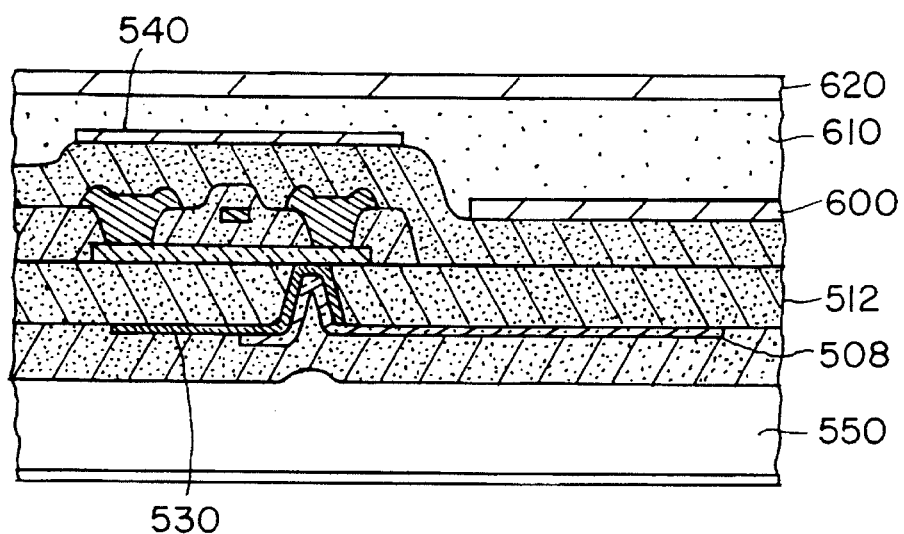

FIGS. 14A–14C illustrates a transfer process in which a 1920×480 array of transistors 502 is formed in a single crystal silicon layer 520 over an insulating layer 512 which is formed over a silicon substrate 500. Pixel electrodes can be formed with the silicon layer or with separately formed transmissive electrodes such as ITO. Color filter elements 600 are fabricated after transistor 500 formation and prior to transfer and fabrication of the pixel electrodes which in this embodiment are formed on the opposite side of the insulator 512 (FIG. 14A). In this particular preferred embodiment, the color filters 600 are polyimide color filters. More specifically, the color filter illustrated is a PiC Green 02 polyimide filter material available from Brewer Science, Inc. of Rolla, Mo. Blue and red filter materials are also available from the same source and use substantially the same processing sequence as described hereinafter. Other color separation and selection techniques can also be employed that are compatible with conventional semiconductor photolithography and processing methods.

A pixel element having a transistor 502 is formed on an insulating layer 520. An optional nitride layer can be formed over the pixel element. An optional adhesion promoter (not shown) can next be coated and baked onto the nitride layer. The adhesion promotor can be APX K-1, also provided by Brewer Science, Inc., which can be spun onto the wafer at 5000 RPM, and then baked in an oven. In a preferred embodiment, however, an adhesion promoter is not used.

A layer of polyimide, such as PiC Green 02 is spun on over the circuit at a speed of 1000–4000 rpm for 90 seconds. The polyimide layer is about 0.5 to 5 microns thick. In a preferred embodiment, the polyimide layer is about 1 to 2 microns thick. The structure is then subjected to a solvent removal bake at 120° C. for 60 seconds on a hotplate for example. It should be noted that a the particular conditions of the solvent bake is not critical. The structure is then subjected to a second or "beta" bake at 175° C. on a hotplate for 90 seconds in vacuum contact. It is critical that the temperature be uniform in the beta bake step because the beta bake defines the develop processing characteristics.

A photoresist pattern is applied to the structure. The positive photoresist is coated, baked and exposed to ultraviolet light using a mask (not shown) at 1.5 to 2 times the normal dosage. The pattern is then developed with a standard fluid developer for 40 seconds. The developer is preferably a metal ion free developer such as Shipely MF-312. The polyimide will develop with the photoresist. The structure is then rinsed in water and dried with nitrogen or clean compressed air.

The photoresist is then removed with a commercially available carbon based solvent, such as Safestrip from Brewer Science, Inc., which is spun onto the structure. The resulting color filter structure is then hard baked between 200° and 280° C. for one hour in an oven. In a preferred embodiment, the baked temperature is 230° C.

The above process is repeated for the red and the blue color filters to provide a full color liquid crystal display. The spin speed and bake temperature are varied as needed depending upon the size of the color filter element. After the color filter elements are completed, the resulting structure is encapsulated using a layer of silicon nitride, oxynitride or silicon oxide. An optically clear polyimide layer can also be used for encapsulation and planarization. The circuit can then be transferred onto a second substrate in accordance with previously described procedures depending upon the type of display being fabricated.

Another preferred embodiment uses red, blue, and green polyimides which incorporate photosensitive material. In this embodiment, the polyimides are put on, exposed and developed. No photoresist is needed using this process. In another preferred embodiment, a filter fabrication process using negative photoresist materials is employed to form an array of color filter elements.

To form a first color filter on each pixel electrode, a pigment is dispersed in a negative resist material and applied as a film. Such colored negative photoresist materials are commercially available. A portion of the film is exposed to light. The remainder of the film is masked (not shown) such that it is not exposed to the light. The exposed portion of the film is developed in the presence of the light to form a first color filter element. The undeveloped portion of the film is removed, leaving a pattern of first color filter elements adjacent to each pixel electrode. Second and third color filter elements are formed in a similar manner as the first color filter elements.

Optionally, a matrix array of opaque (or black) element 540 can be formed over or adjacent the transistor region of each pixel electrode as well as over the interprise spaces. Each opaque element serves to absorb light and provide a uniform background.

FIG. 14B shows the structure after transfer onto substrate 620 with adhesive 610 and exposure of transistor contact 504. FIG. 14C shows the device after electrode 508 formation on the opposite side of insulator 512. The electrode 508 can be formed on the opposite side of insulator 512 by deposition of a transparent electrode material such as indium tin oxide. A contact metalization 530 can be used. A liquid crystal material 550 is inserted in the gap with the counter electrode.

Figure 15A:
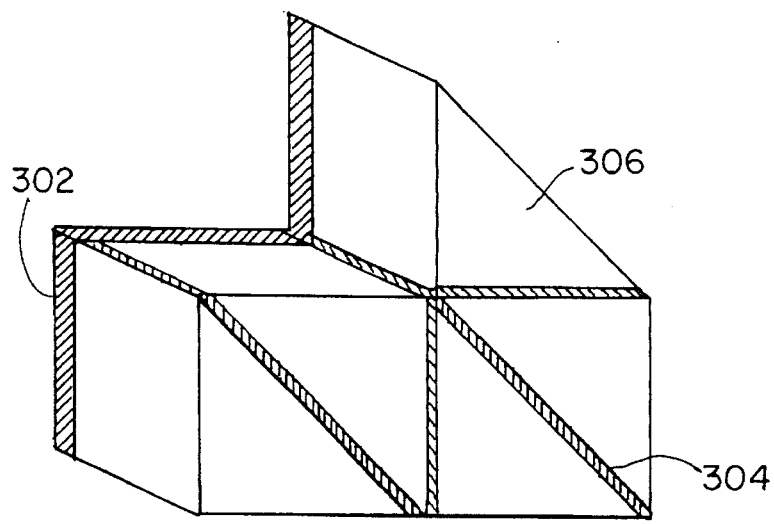
FIGS. 15A–15C show perspective, bottom and side views, respectively, of a light valve optical alignment system in accordance with the invention.
Figure 15B:
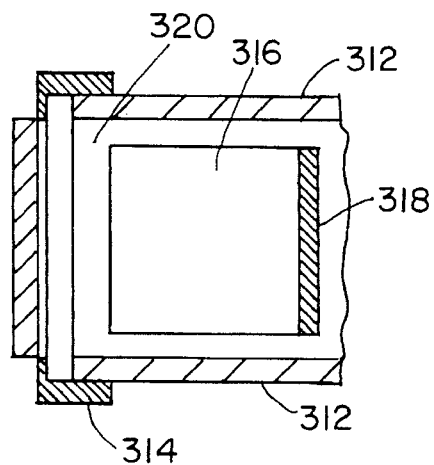
Figure 15C:
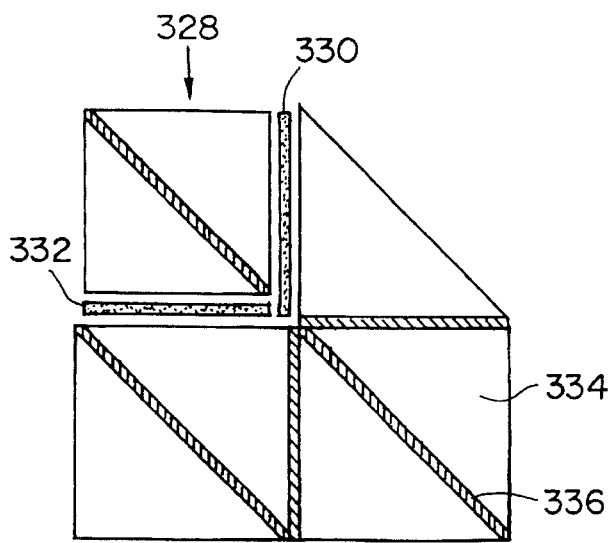

FIG. 15A is an inverted perspective view of a combiner used in the three light valve system described previously. Glass elements 306 are secured with bonding cement 304. Metal plates 302 (shown on one side only) are secured to each side. As shown in FIG. 15B, the side metal plates 312 are used to attach the light valves with brackets 314. The brackets for mounting light valve 316 adjacent to surface 320 are not shown for clarity. A portion only of the third valve 318 is shown in this bottom view of the combiner shown in FIG. 1. The bracket mount system is described in greater detail in U.S. Ser. No. 08/111,131 filed on Aug. 25, 1993, the entire contents of which are incorporated herein by reference. In FIG. 15C an additional cube 328 can be used to support polarizers (not shown) adjacent to valves 330 and 332 which are aligned by elements 334 bonded together by transparent cement or adhesive 336.

Figure 16:
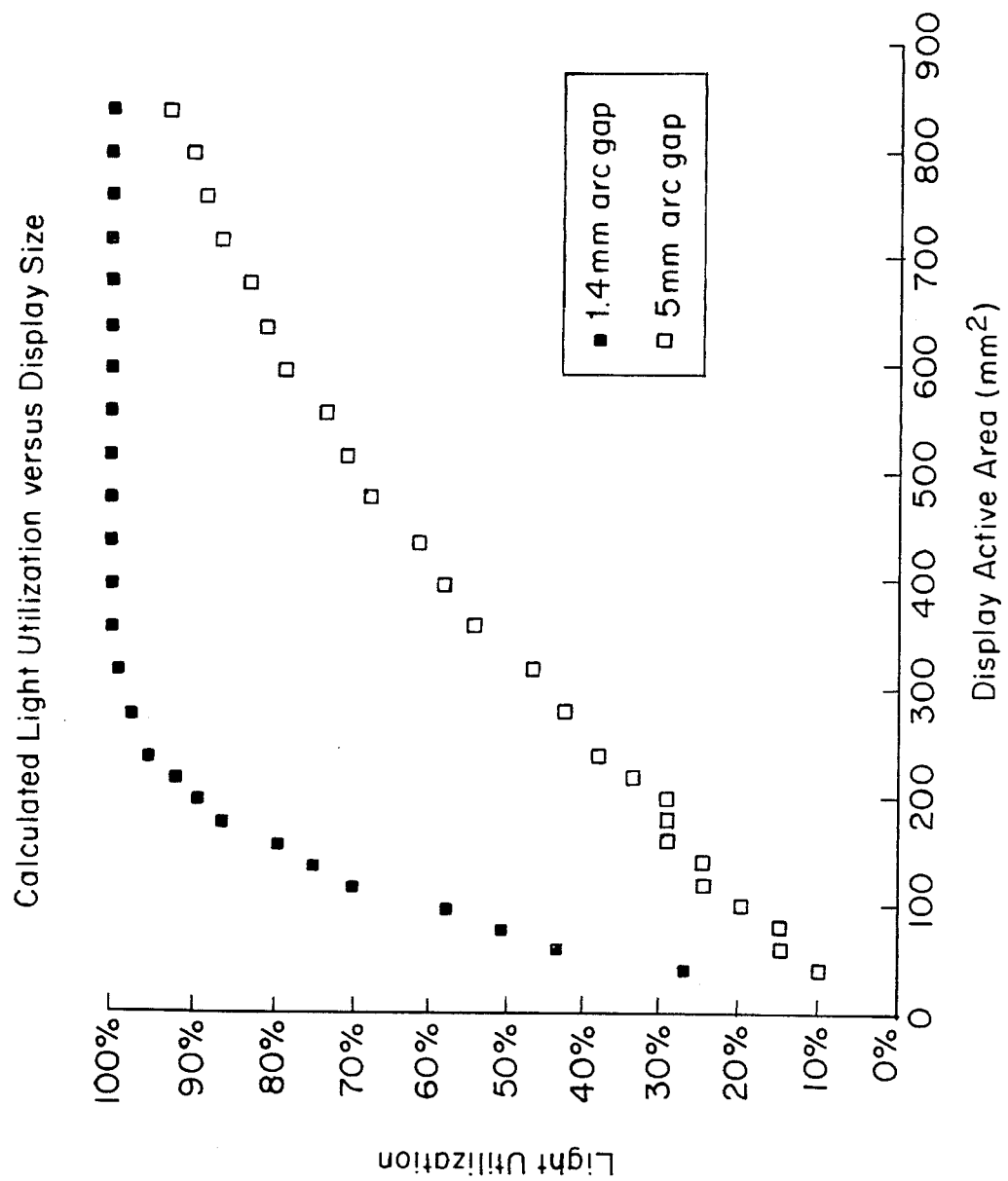
FIG. 16 shows a schematic graphical representation illustrating the improved light utilization provided by the light valve projection system of the present invention.

FIG. 16 illustrates the advantages of using lamps with an arc gap under 2 mm. In this particular illustration where the arc gap is 1.4 mm, an display having an active area of 300 $mm^2$ transmits nearly 100% of the available light resulting in a substantially brighter display than that provided by lamps of the same active area but larger arc gap.

Equivalents

While this invention has been particularly shown and described with reference to preferred embodiments thereof, it will be understood by those skilled in the art that various changes in form and details may be made therein without departing from the spirit and scope of the invention as defined by the appended claims.

We claim:

1. A light valve projection system comprising:

an arc lamp having an arc gap of less than 2 mm;

an optical coupler positioned to receive light from the arc lamp and to direct the light along an optical path;

an active matrix light valve comprising a plurality of pixel electrodes and having a pixel resolution of at least 300,000, the pixels defining an active area of the light valve through which light from the optical coupler is directed along the optical path, the active area being less than 320 $mm^2$;

a projection lens positioned to receive light directed through the active matrix light valve along the optical path and to project the light onto a viewing surface.

2. The light valve projection system of claim 1 further comprising a plurality of active matrix light valves.

3. The light valve projection system of claim 1 wherein the active matrix light valve comprises a plurality of color filters.

4. The light valve projection system of claim 1 wherein the active matrix light valve comprises a plurality of thin film transistors formed in single crystal silicon.

5. The light valve projection system of claim 1 wherein the active matrix light valve comprises a liquid crystal display.

6. The light valve projection system of claim 1 wherein the active matrix light valve comprises a plurality of pixel electrodes, each pixel electrode being electrically connected to a transistor circuit.

7. The light valve projection system of claim 4 wherein the film transistors are bonded to an optically transmissive substrate with an adhesive.

8. The light valve projection system of claim 1 wherein the arc lamp comprises a xenon arc lamp or a metal halide arc lamp.

9. The light valve projection system of claim 1 further comprising a housing containing the arc lamp, the optical coupler, the active matrix light valve and the projection lens.

10. An active matrix liquid crystal display color projector comprising:

a housing;

an arc lamp within the housing;

a plurality of dichroic mirrors within the housing to separate light from the lamp into three primary colors;

a three light valve system, each light valve comprising an active matrix liquid crystal display with a pixel resolution of at least 300,000, and positioned to receive one of the three primary colors, each active matrix liquid crystal display having a light transmission area of less than 320 $mm^2$;

an optical combiner that combines light transmitted through each light valve into a combined image; and a projection lens mounted to the housing to direct the combined image onto a viewing surface.

11. The color projector of claim 10 wherein the arc lamp has an arc gap of between 1.0 and 1.6 mm.

12. The color projector of claim 10 wherein a light valve is mounted on the combiner.

13. The color projector of claim 10 further comprising an optical integrator to couple light from the lamp to the light valve system.

14. The color projector of claim 10 wherein the projector has a volume less than 400 cubic inches.

15. A light valve color projector comprising:

a housing;

a light source including an arc lamp having an arc gap of less than 2 mm and positioned within the housing directing light in a first direction along an optical path;

a projection lens positioned to receive light directed in a second direction along the optical path;

a pair of mirrors in the optical path to reflect light from the first direction to the second direction; and a light valve system having a plurality of light valves that generate a plurality of images having different colors, each light valve having a pixel resolution of at least 300,000, the light valve system further having a combiner that combines the plurality of images to form a colored image, the light valve system positioned along the optical path between the light source and the projection lens such that the projection lens projects the combined colored image onto a viewing surface.

16. The color projector of claim 15 wherein the housing has a vertical axis and a horizontal axis and the projection lens is positioned above the light source along the vertical axis.

17. The color projection of claim 15 wherein the housing has a horizontal plane and projection lens and light source are positioned in the horizontal plane.

18. The color projector of claim 15 wherein the first direction along the optical path is parallel to the second direction along the optical path.

19. The color projector of claim 15 wherein the light valve system further comprises a plurality of dichroic mirrors that separate or combine light of different colors and a plurality of reflective mirrors.

20. The color projector of claim 15 wherein the combiner includes a plurality of prisms, the prisms being bonded together to form a combining element.

\* \* \* \* \*